United States Patent
Manabe

(10) Patent No.: US 9,121,161 B2
(45) Date of Patent: Sep. 1, 2015

(54) CONSTRUCTION MACHINE

(71) Applicant: HITACHI CONSTRUCTION MACHINERY CO., LTD., Tokyo (JP)

(72) Inventor: Takeo Manabe, Ishioka (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 177 days.

(21) Appl. No.: 13/798,648

(22) Filed: Mar. 13, 2013

(65) Prior Publication Data
US 2013/0259623 A1 Oct. 3, 2013

(30) Foreign Application Priority Data
Mar. 28, 2012 (JP) .................................. 2012-73446

(51) Int. Cl.
E02F 3/36 (2006.01)
E02F 9/08 (2006.01)
E02F 9/18 (2006.01)
B60R 11/00 (2006.01)

(52) U.S. Cl.
CPC ................ *E02F 3/36* (2013.01); *E02F 9/0891* (2013.01); *E02F 9/18* (2013.01); *B60R 2011/0038* (2013.01); *Y10S 292/11* (2013.01)

(58) Field of Classification Search
CPC ............. E02F 9/0891; E02F 9/18; E02F 3/36; B60R 2011/0038; B60J 5/10; Y10S 292/11; Y10S 292/14; Y10S 292/23; Y10S 292/30
USPC .................................................. 280/758, 759
See application file for complete search history.

(56) References Cited

U.S. PATENT DOCUMENTS

| 2,634,997 | A | * | 4/1953 | Gallowitz | 292/128 |
| 5,016,721 | A | * | 5/1991 | Yamamoto et al. | 180/89.13 |
| 6,014,876 | A | * | 1/2000 | Taylor | 70/240 |
| 6,615,942 | B2 | * | 9/2003 | Shinohara et al. | 180/69.21 |
| 6,637,785 | B2 | * | 10/2003 | Sugimoto | 292/336.3 |
| 6,733,062 | B1 | * | 5/2004 | Albright et al. | 296/51 |
| 6,758,513 | B2 | * | 7/2004 | Choo | 296/146.8 |
| 6,991,273 | B2 | * | 1/2006 | Kim | 292/336.3 |
| 8,485,571 | B2 | * | 7/2013 | Shinoda et al. | 292/201 |

FOREIGN PATENT DOCUMENTS

JP 2001-040702 A 2/2001

* cited by examiner

Primary Examiner — Joseph Rocca
Assistant Examiner — Timothy Wilhelm
(74) Attorney, Agent, or Firm — Mattingly & Malur, PC

(57) ABSTRACT

A striker provided on a rear surface part of an engine cover is mounted on the rear surface part by using nuts from an inner surface. In a counterweight, a bracket is mounted on a top surface of a center weight portion by using bracket bolts, and a latch is mounted on a latch mounting surface of the bracket by using latch bolts. In this state, a hiding member is mounted on a hiding member mounting surface of the bracket by using hiding member bolts. At this time, the hiding member can cover and hide the bracket bolts and the latch bolts. Further, at the time the engine cover is closed, the bolts can be hidden.

7 Claims, 16 Drawing Sheets

CONSTRUCTION MACHINE

TECHNICAL FIELD

The present invention relates to a construction machine such as a hydraulic excavator equipped with a prime mover cover for covering a prime mover such as an engine.

BACKGROUND ART

In general, a hydraulic excavator as a typical example of a construction machine comprises an automotive lower traveling structure, an upper revolving structure swingably mounted on the lower traveling structure, and a working mechanism mounted in a front side of the upper revolving structure in the front-rear direction to be capable of tilting up and down.

The upper revolving structure is configured by a revolving frame forming a support structure, a cab which is located in a front side of the revolving frame and onto which an operator gets, a counterweight located in a rear side of the revolving frame to act as a weight balance to the working mechanism, a prime mover such as an engine positioned in a front side of the counterweight and mounted on the revolving frame to drive a hydraulic pump, and a prime mover cover formed of a top surface part covering the prime mover from above, and a rear surface part hanging down from a rear end of the top surface part and making contact with a top surface of the counterweight.

The prime mover cover is configured such that a front portion of the top surface part is mounted to a structural body forming a part of the revolving frame by using a hinge member. Thereby the prime mover cover is provided to be rotatable (openable and closable) in the upper-lower direction with the front portion acting as the fulcrum. A striker is mounted on the top surface of the counterweight, and a latch is provided on the rear surface part of the prime mover cover to be engaged to the striker when the prime mover cover is closed, wherein the striker and the latch form part of a lock device (Patent Document 1).

PRIOR ART DOCUMENT

Patent Document

Patent Document 1: Japanese Patent Laid-Open No. 2001-40702 A

SUMMARY OF THE INVENTION

Incidentally, according to Patent Document 1, the striker provided in the counterweight and the latch provided in the prime mover cover can be locked in a state where the prime mover cover is closed by engaging the latch to the striker. In this case, since the latch is engaged to the striker in a position inside of the rear surface part in the prime mover cover, an engagement state between the latch and the striker cannot be visually confirmed. Therefore there is a problem that it takes time and effort to perform an adjustment work of the engagement state between the latch and the striker in an assembling work of the prime mover cover.

Therefore it is considered to arrange the latch and the striker such that the engagement adjustment between the latch and the striker can be carried out from an outside of the prime mover cover. In this case, the latch and the striker are required to be arranged outside of the prime mover cover. However, in a case where the latch and the striker are arranged outside of the prime mover cover, fixing tools for mounting the latch and the striker, such as bolts and nuts, are also exposed to the outside. In a state where the bolt and the nut are exposed to the outside in this way, the bolt and the nut can be loosened from the outside. Therefore even if the lock device is locked, there is a problem that the prime mover cover can be made to open simply by removing the bolt from the outside.

In view of the above-discussed problem with the conventional art, it is an object of the present invention to provide a construction machine which, in a case where a latch and a striker are arranged outside of a prime mover cover, can cover and hide fixing tools for fixing them and certainly lock a lock device in a state where the prime mover cover is closed.

(1) According to the present invention, a construction machine comprises: an automotive lower traveling structure; an upper revolving structure swingably mounted on the lower traveling structure; and a working mechanism mounted in the upper revolving structure to be capable of tilting up and down; the upper revolving structure comprises: a revolving frame forming a support structure; a counterweight located in a rear side of the revolving frame to act as a weight balance to the working mechanism; a prime mover positioned in a front side of the counterweight and mounted on the revolving frame to drive a hydraulic pump; a prime mover cover including a top surface part covering the prime mover from above and a rear surface part hanging down from a rear end of the top surface part and making contact with a top surface of the counterweight; and a lock device for lockably/unlockably locking the prime mover cover to the counterweight in a state where the prime mover cover is closed.

In order to solve the aforementioned problem, a characteristic of a configuration adopted by the present invention is that the lock device comprises: a striker provided in the rear surface part of the prime mover cover; a bracket provided on the top surface of the counterweight, the bracket including a rear side forming a latch mounting surface and a top side forming a hiding member mounting surface; a latch mounted on the latch mounting surface of the bracket by using a latch fixing tool and engaged to the striker; and a hiding member mounted on the hiding member mounting surface of said bracket by using a hiding member fixing tool to cover and hide the latch fixing tool; wherein the hiding member fixing tool is arranged in a position of being hidden inside of the prime mover cover when the prime mover cover is closed.

With this arrangement, the striker provided in the rear surface part of the prime mover cover can be mounted in the rear surface part by using the fixing tool from the inside of the prime mover cover. On the other hand, the latch is mounted on the latch mounting surface in the rear side of the bracket provided on the top surface of the counterweight, by using the latch fixing tool. In this state, the hiding member is mounted to the hiding member mounting surface in the top side of the bracket by using the hiding member fixing tool. As a result, the latch fixing tool can be covered and hidden by the hiding member. Further, since the hiding member fixing tool for mounting the hiding member can be arranged in a position of being hidden in the inside of the prime mover cover at the time of closing the prime mover cover, the hiding member fixing tool cannot be loosened or removed from outside in a state where the prime mover cover is closed.

Accordingly, since the striker and the latch can be engaged to each other outside of the prime mover cover, the adjustment work of the engagement state between the striker and the latch can be easily carried out visually. On the other hand, when the prime mover cover is closed and the lock device is locked, since the latch fixing tool for fixing the latch can be covered and hidden, the prime mover cover can be certainly locked to prevent the prime mover cover from inadvertently opening.

(2) According to the present invention, it is configured such that the bracket is mounted to the top surface of the counterweight by using a bracket mounting tool, and the hiding member covers and hides the bracket fixing tool together with the latch fixing tool.

With this arrangement, since the bracket is mounted to the top surface of the counterweight by using the bracket fixing tool, the bracket can be easily mounted on the top surface of the known counterweight. Further, the bracket fixing tool for mounting the bracket can be covered and hidden with the hiding member.

(3) According to the present invention, it is configured such that at the time of closing the prime mover cover, a lower end portion of the rear surface part makes contact with a top surface of the hiding member, and the hiding member fixing tool is arranged closer to the inside of the rear surface part than a contact position between the lower end portion of the rear surface part and the top surface of the hiding member.

With this arrangement, in a state where the prime mover cover is closed, the lower end portion of the rear surface part in the prime mover cover can make contact with the top surface of the hiding member. At this time, since the hiding member fixing tool is arranged closer to the inside of the rear surface part than the contact position between the prime mover cover and the hiding member, the hiding member fixing tool can be covered and hidden with the closed prime mover cover to prevent a visual contact thereof from outside.

(4) According to the present invention, it is configured such that the rear surface part in the prime mover cover is notched at a lower end side in a position corresponding to the lock device, thereby forming a notched portion in the rear surface part, in which the hiding member is fitted at the time of closing the prime mover cover, and the rear surface part of the prime mover cover is recessed to a side of the prime mover in a position corresponding to the notched portion, thereby forming a lock device-accommodating recessed portion in the rear surface part for accommodating the lock device.

With this arrangement, in a state of providing the bracket and the hiding member on the top surface of the counterweight, the hiding member for covering the bracket is in a state of projecting from the top surface of the counterweight. On the other hand, since the notched portion is provided in the rear surface part in the prime mover cover at the lower end side in the position corresponding to the lock device, the hiding member can be fitted in the notched portion at the time of closing the prime mover cover. Therefore the prime mover cover can make contact with the counterweight without a clearance.

On the other hand, the lock device-accommodating recessed portion recessed toward the inside as the side of the prime mover is provided in the position corresponding to the notched portion of the rear surface part in the prime mover cover, and the striker is mounted to the lock device-accommodating recessed portion. Accordingly, in a state of engaging the latch to the striker, the lock device can be accommodated in the lock device-accommodating recessed portion such that it does not project out of the rear surface part of the prime mover cover, and can be protected not to interfere with obstacles in the surroundings.

(5) According to the present invention, it is configured such that the counterweight comprises: a center weight portion positioned in the center of the left-right direction; a left weight portion positioned in the left side of the center weight portion and formed to have a height dimension lower than that of the center weight portion; and a right weight portion positioned in the right side of the center weight portion and formed to have a height dimension lower than that of the center weight portion; wherein the rear surface part of the prime mover cover makes contact with the center weight portion, and the bracket is provided on the top surface of the center weight portion.

With this arrangement, the counterweight is formed in a reverse T-letter shape by the high center weight portion, the low left weight portion, and the low right weight portion. In this case, the counterweight can make contact with the rear surface part of the prime mover cover by using the center weight portion high in the height dimension, and further, the bracket can be provided on the top surface of the center weight portion.

(6) According to the present invention, it is configured such that the striker is mounted to the rear surface part of the prime mover cover from the inside of the rear surface part by using a striker fixing tool. Therefore the striker fixing tool can be protected in such a manner as not to be loosened from outside.

(7) According to the present invention, the hiding member fixing tool includes a bolt fixed through the hiding member to the bracket. Therefore the hiding member can be mounted to the bracket by using the hiding member bolt.

MODE FOR CARRYING OUT THE INVENTION

Hereinafter, a crawler type hydraulic excavator equipped with an engine will be taken as a typical example of a construction machine according to an embodiment of the present invention, which will be in detail explained with reference to the accompanying drawings.

FIG. 1 to FIG. 15 show a construction machine according to a first embodiment of the present invention.

Figure 1:
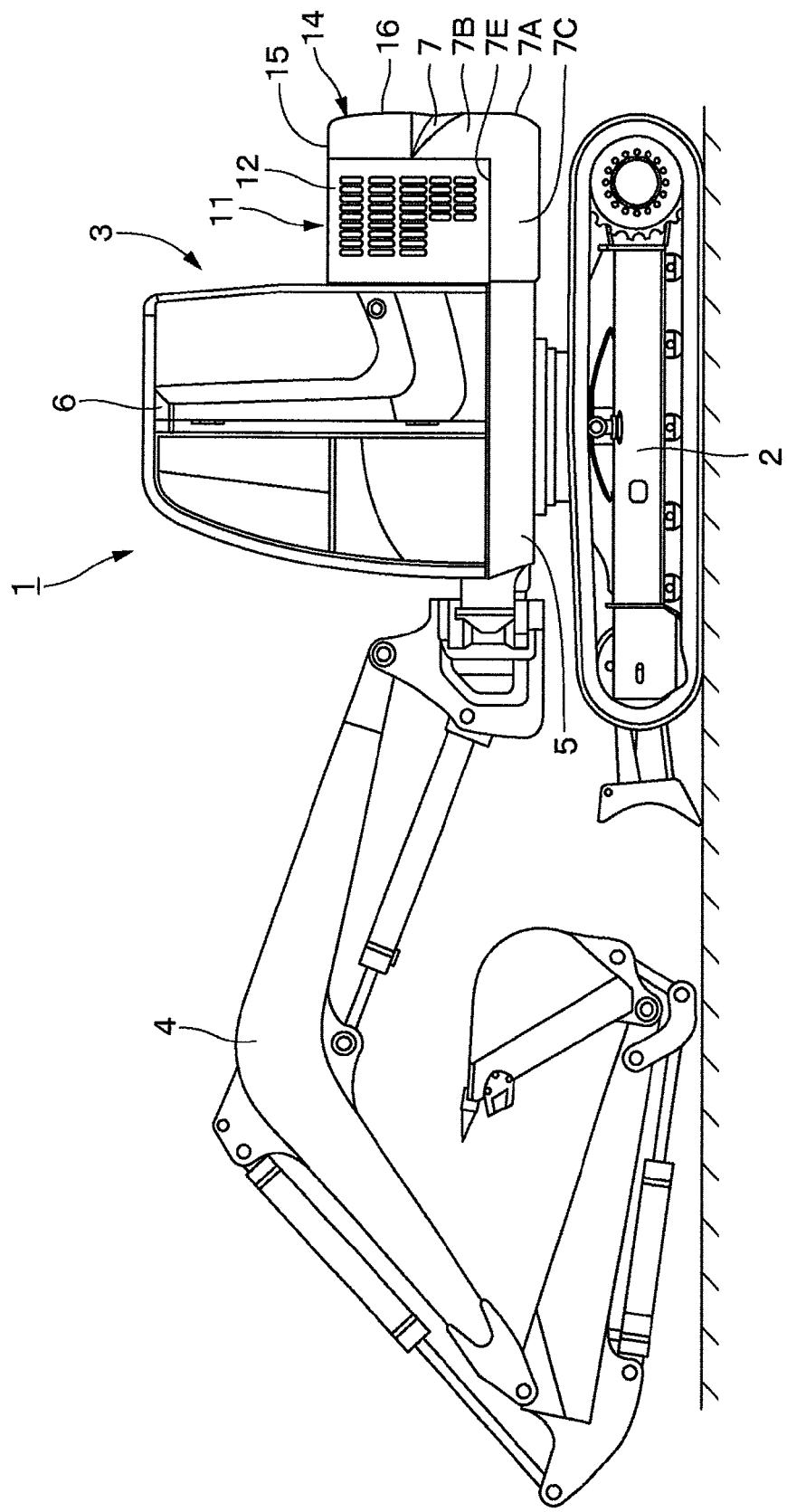
FIG. 1 is a front view showing a hydraulic excavator according to a first embodiment of the present invention.

In FIG. 1, designated at 1 is a compact hydraulic excavator of a crawler type as a construction machine. The hydraulic excavator 1 is configured by an automotive crawler type lower traveling structure 2, an upper revolving structure 3 swingably mounted on the lower traveling structure 2, and a working mechanism 4 provided in a front side of the upper revolving structure 3 in the front-rear direction to be capable of rocking, as well as tilting up and down, so as to perform the operation of excavating earth and sand.

Figure 2:
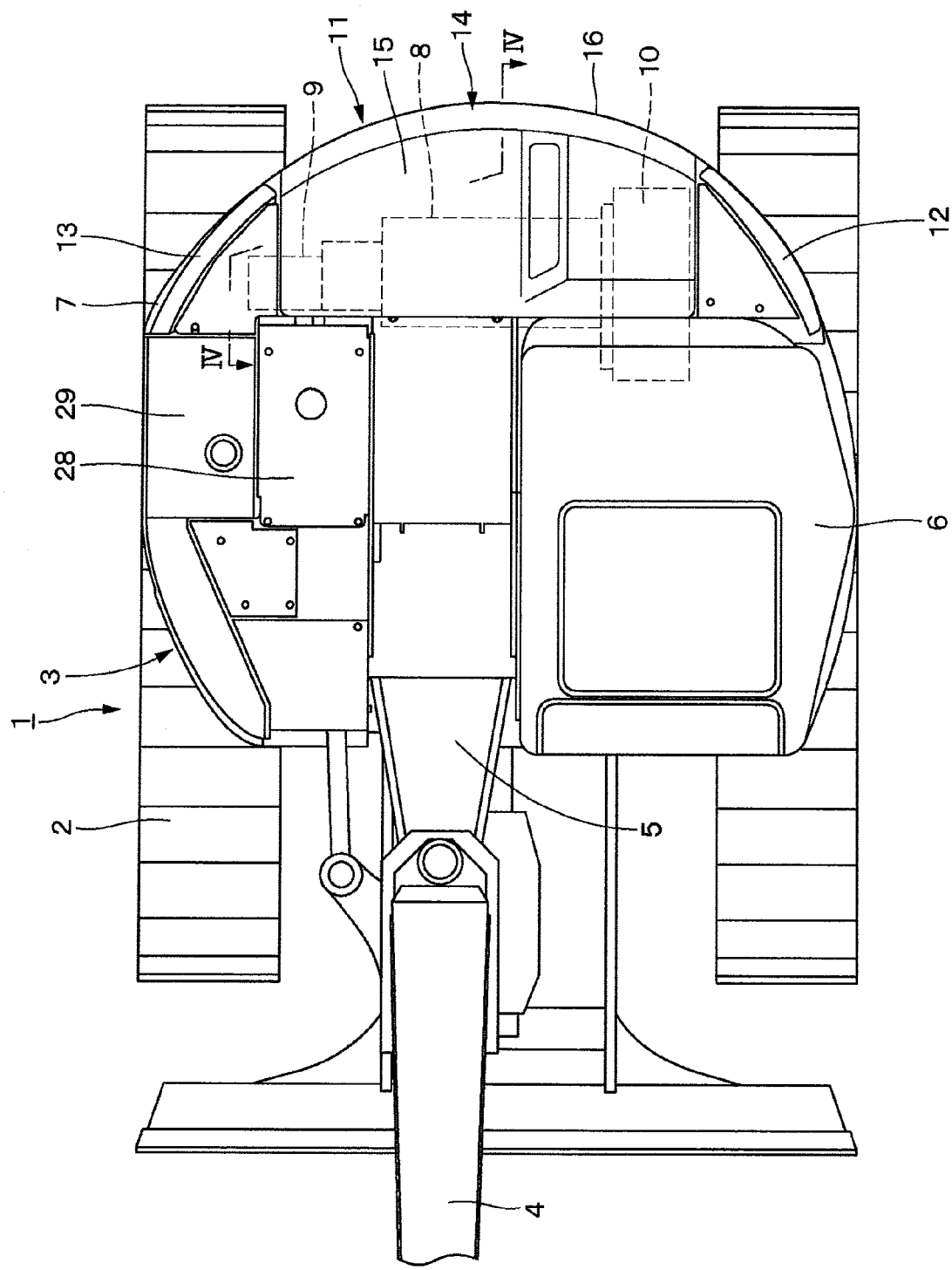
FIG. 2 is an enlarged plan view showing the hydraulic excavator in a state where a part of a working mechanism is omitted.

Here, as shown in FIG. 2, the hydraulic excavator 1 is configured as a small revolving machine which the upper revolving structure 3 of which can revolve in a small revolving diameter. The upper revolving structure 3 of this case is formed in a substantially circular shape as viewed from above and is formed in a compact size as a whole.

The upper revolving structure 3 is configured by the revolving frame 5 forming a support structure, a cab 6, a counterweight 7, an engine 8, an exterior cover 11, a lock device 17 and the like provided on the revolving frame 5, which will be described later. The working mechanism 4 is mounted to the front side of the revolving frame 5 to be capable of rocking, as well as tilting up and down. On the other hand, a cover support member 5A (refer to FIG. 4) is provided in the rear side of the revolving frame 5 to be positioned closer to the front side of the engine 8. The cover support member 5A is formed of an angular tubular body extending in the left-right direction to be positioned above the engine 8, for example, and a front side portion of a top surface part 15 in an engine cover 14 is mounted on a top surface of the cover support member 5A through a hinge member 15B to be described later.

The cab 6 is mounted in the left front side of the revolving frame 5 and the cab 6 is formed as a box body extending in the upper-lower direction. The cab 6 is provided for an operator to get onto, and an operator's seat for an operator to be seated therein, a control lever for traveling and a control lever for working (none of them are shown) are disposed inside the cab 6.

The counterweight 7 is mounted in the rear side of the revolving frame 5, and the counterweight 7 acts as a weight balance to the working mechanism 4, and is formed as a heavy load. Here, the counterweight 7, for the purpose of making a revolving diameter thereof at a revolving operation small, has an outer peripheral surface 7A in an arc shape formed by bending both of left and right sides thereof toward the front side. Therefore, the counterweight 7 is arranged for the left end portion to be positioned close to the rear portion of the cab 6, and for the right end portion to be positioned close to the rear portion of a fuel tank 29 to be described later.

Figure 3:
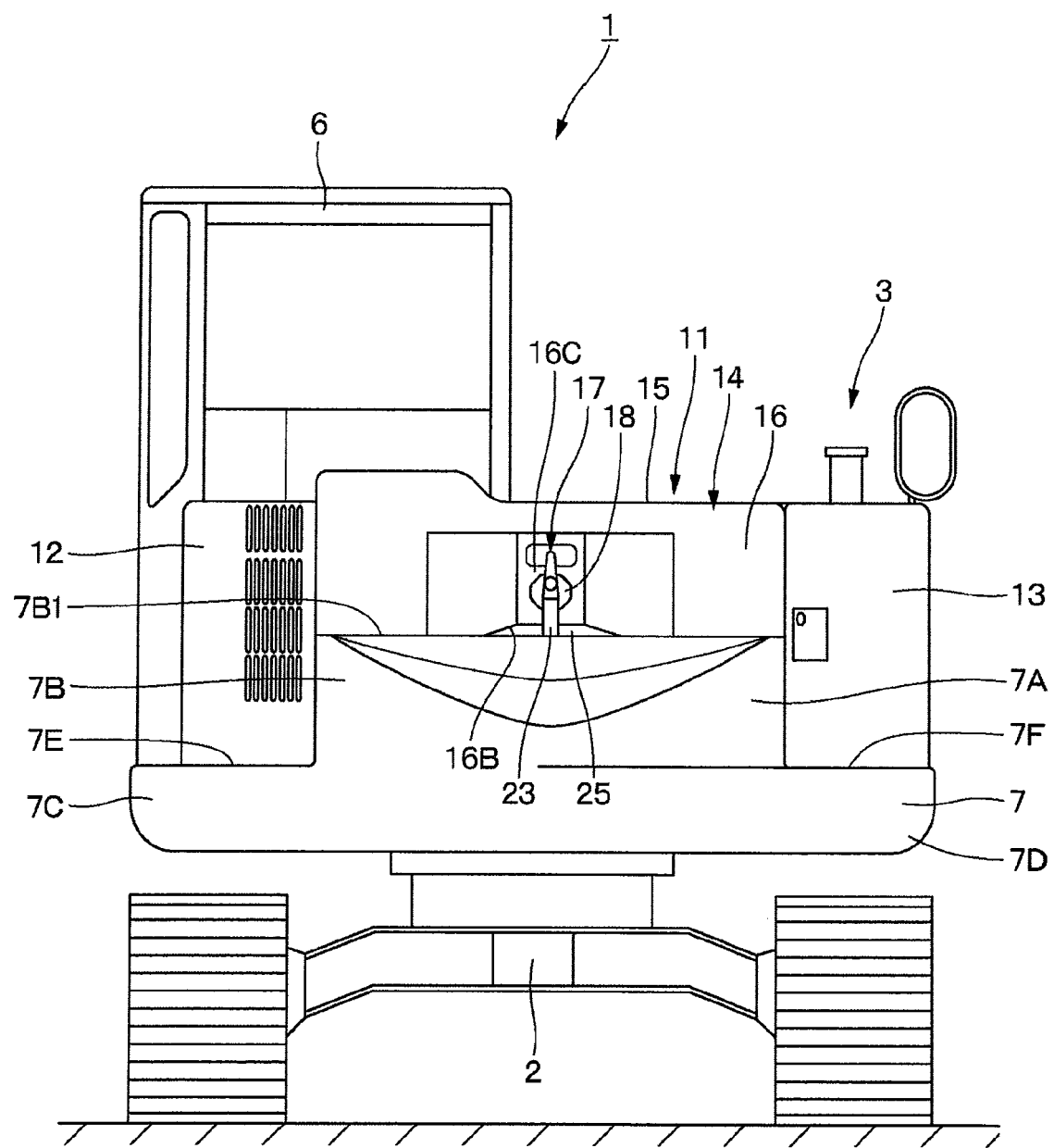
FIG. 3 is a rear view shown by enlarging the hydraulic excavator from a rear side.
Figure 5:
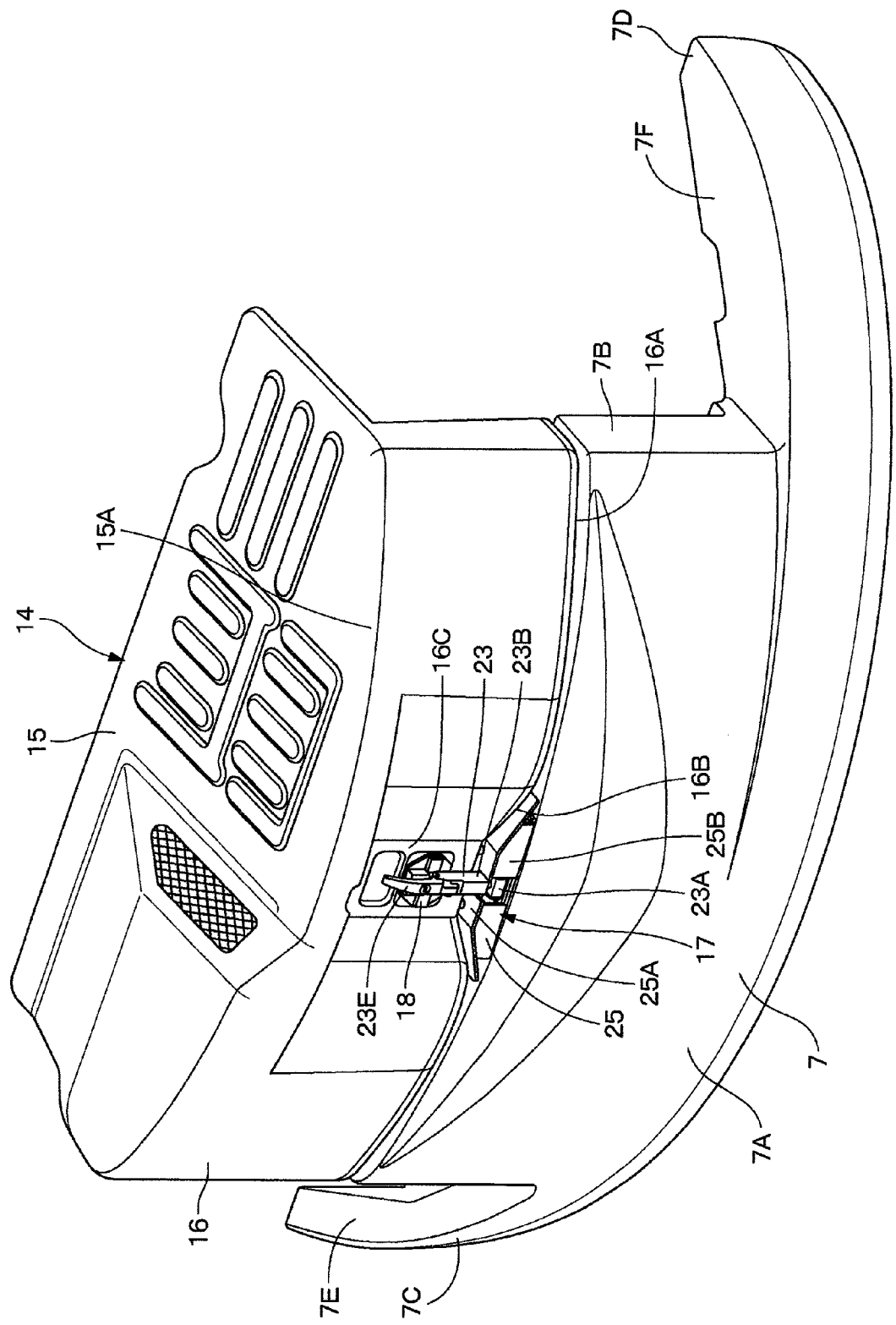
FIG. 5 is an external perspective view showing a state where an engine cover is closed and a lock device is locked, as viewed from an oblique rear side.

As shown in FIG. 3 and FIG. 5, the arc-shaped counterweight 7 is configured by a center weight portion 7B positioned in the center in the left-right direction, a left weight portion 7C positioned in the left side of the center weight portion 7B and formed to have a height dimension lower than that of the center weight portion 7B and a right weight portion 7D positioned in the right side of the center weight portion 7B and formed to have a height dimension lower than that of the center weight portion 7B. The center weight portion 7B projects backward and the left and right weight portions 7C and 7D extend in the left-right direction from the center weight portion 7B and are curved forward. Therefore a left door mounting portion 7E is formed in the left side of the counterweight 7 by a step between the center weight portion 7B and the left weight portion 7C. On the other hand, a right door mounting portion 7F is formed in the right side of the counterweight 7 by a step between the center weight portion 7B and the right weight portion 7D.

Figure 7:
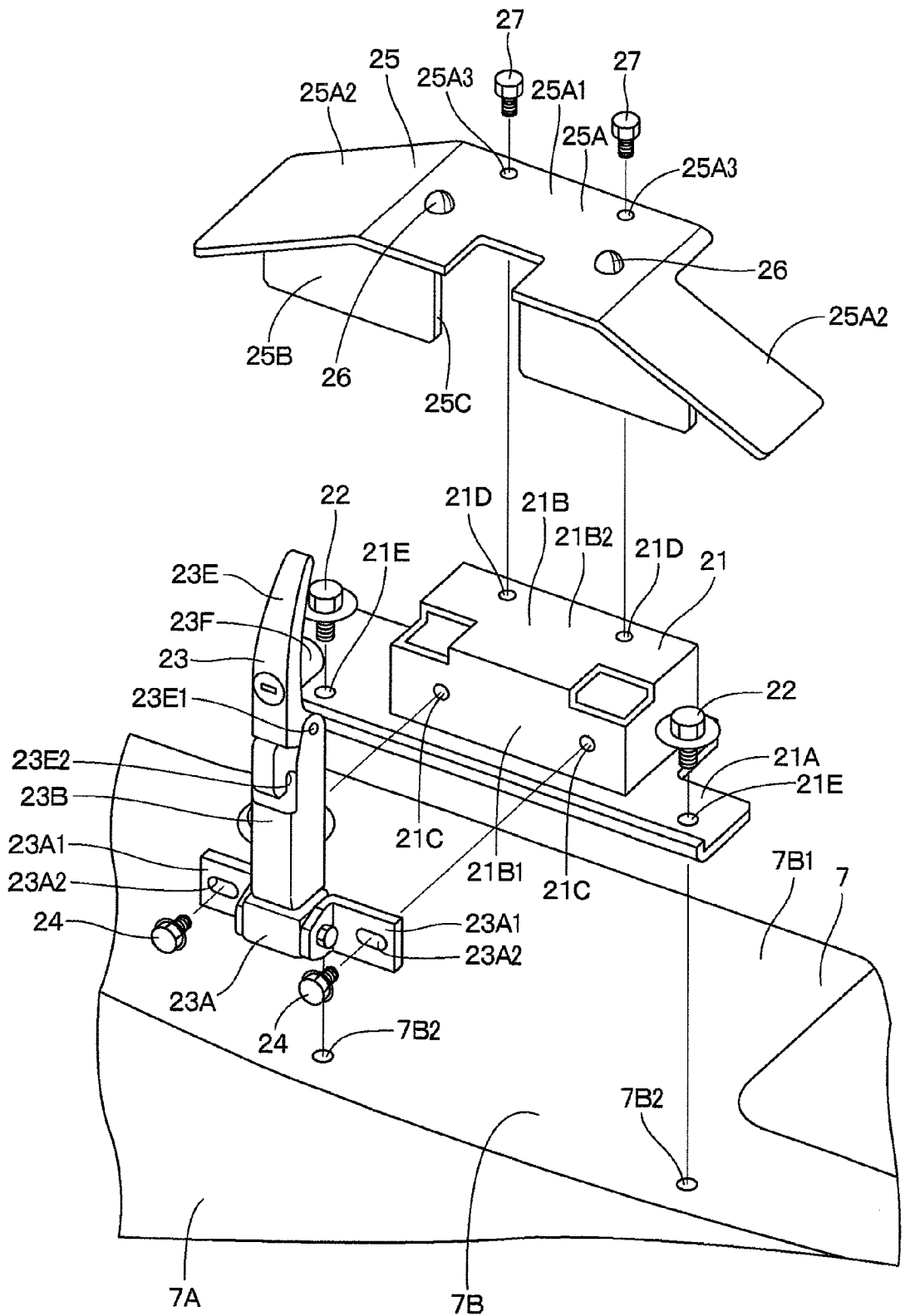
FIG. 7 is a partially enlarged, exploded perspective view showing a state where a part of the counterweight, a bracket, a latch, and the hiding member are exploded.
Figure 8:
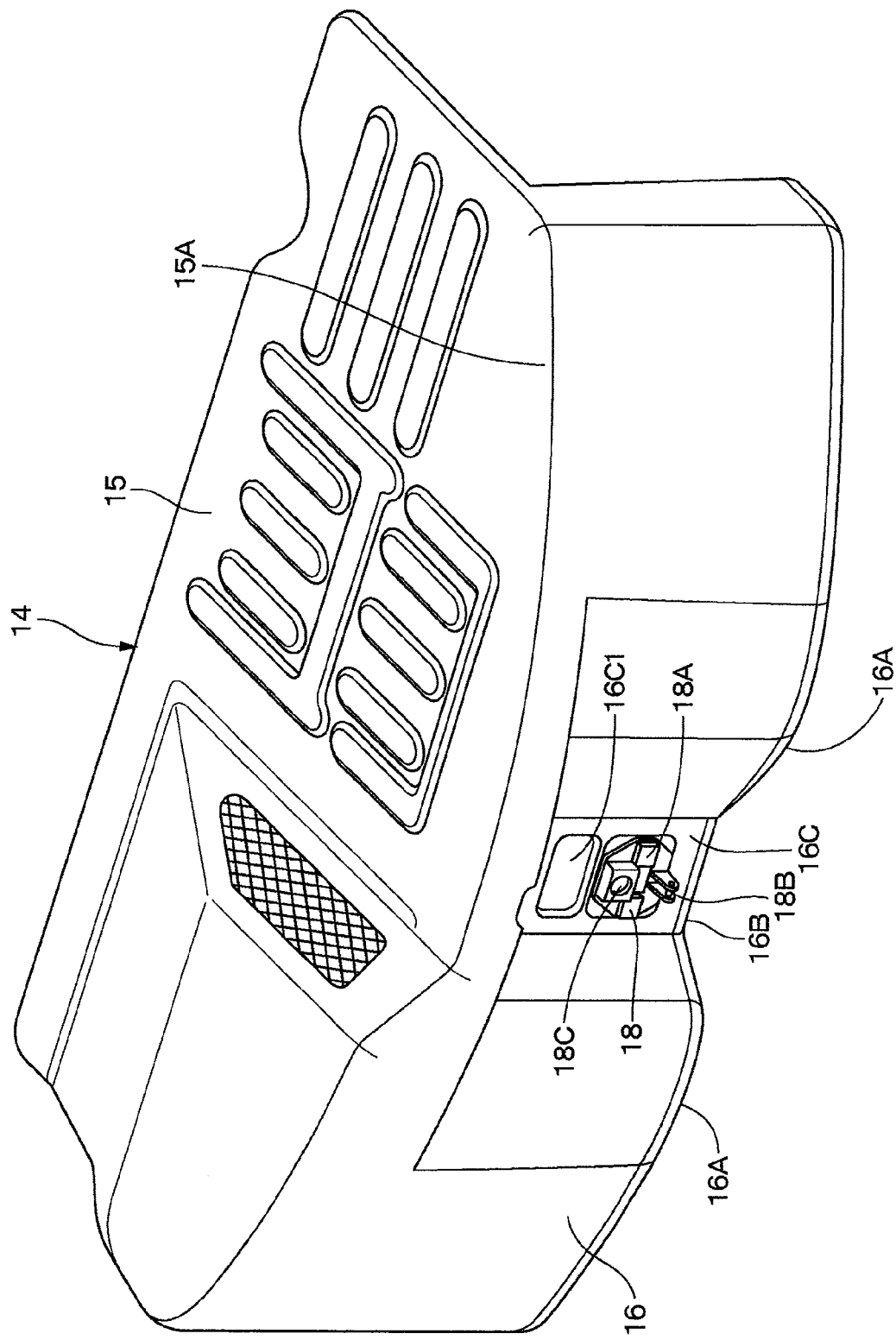
FIG. 8 is an external perspective view showing the engine cover and a striker.

Here, as shown in FIG. 7, the center weight portion 7B in the counterweight 7 has a top surface 7B1 which is formed in a substantially flat shape and is provided with two female screw holes 7B2 formed in the center portion of the left-right direction of top surface 7B1 and in a position closer to the rear side thereof to have an interval in the left-right direction therebetween. Bracket bolts 22 for fixing a bracket 21 to be described later are threaded into the two female screw holes 7B2.

Figure 4:
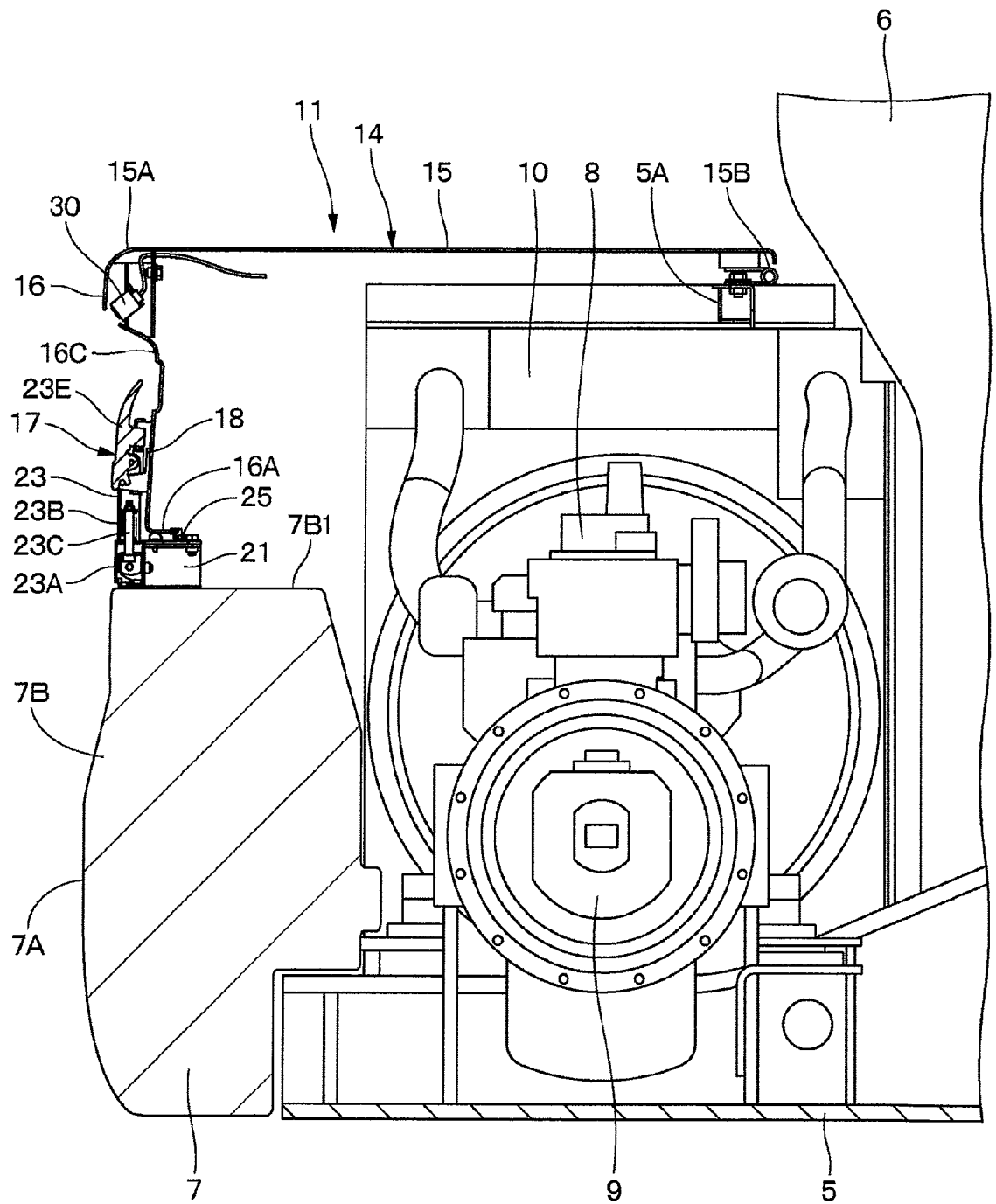
FIG. 4 is a partially enlarged cross-sectional view as viewed in the direction of arrows IV-IV in FIG. 2.

Indicated at 8 is the engine as the prime mover positioned in front of the counterweight 7 and mounted on the revolving frame (refer to FIG. 2 and FIG. 4). The engine 8 is located in a transverse state extending in the left-right direction, and is mounted to the rear side of the revolving frame 5 through a vibration isolating mount. A hydraulic pump 9 is mounted in the right side of the engine 8, and a heat exchanger 10 such as a radiator, an oil cooler or the like are disposed in the left side of the engine 8.

The exterior cover 11 is provided on the revolving frame 5 to be positioned between the cab 6 and the counterweight 7, and is arranged to cover the engine 8, the hydraulic pump 9, the heat exchanger 10 and the like. The exterior cover 11 is configured by a left side door 12, a right side door 13 and the engine cover 14, which will be described later.

As shown in FIG. 3, the left side door 12 is provided in the left front side of the counterweight 7, and is formed as an openable and closable door extending upward from a left door mounting portion 7E. On the other hand, the right side door 13 is provided in the right front side of the counterweight 7, and is formed as an openable and closable door extending upward from a right door mounting portion 7F.

Designated at 14 is the engine cover as a prime mover cover provided to be positioned between the left and right side doors 12 and 13. The engine cover 14 is arranged to cover a range from the cab 6 and an operating oil tank 28 to be described later to the counterweight 7, and the engine cover 14 is formed by performing bending work to a metallic thin plate. That is, as shown in FIG. 4, the engine cover 14 is configured by the top surface part 15 extending in the front-rear direction and in the left-right direction so as to cover the engine 8 from above, and a rear surface part 16 hanging down from a rear end 15A in an arc shape of the top surface part 15. The top surface part 15 has a front portion rotatably (openably and closably) mounted to the cover support member 5A of the revolving frame 5 through the hinge member 15B.

Figure 6:
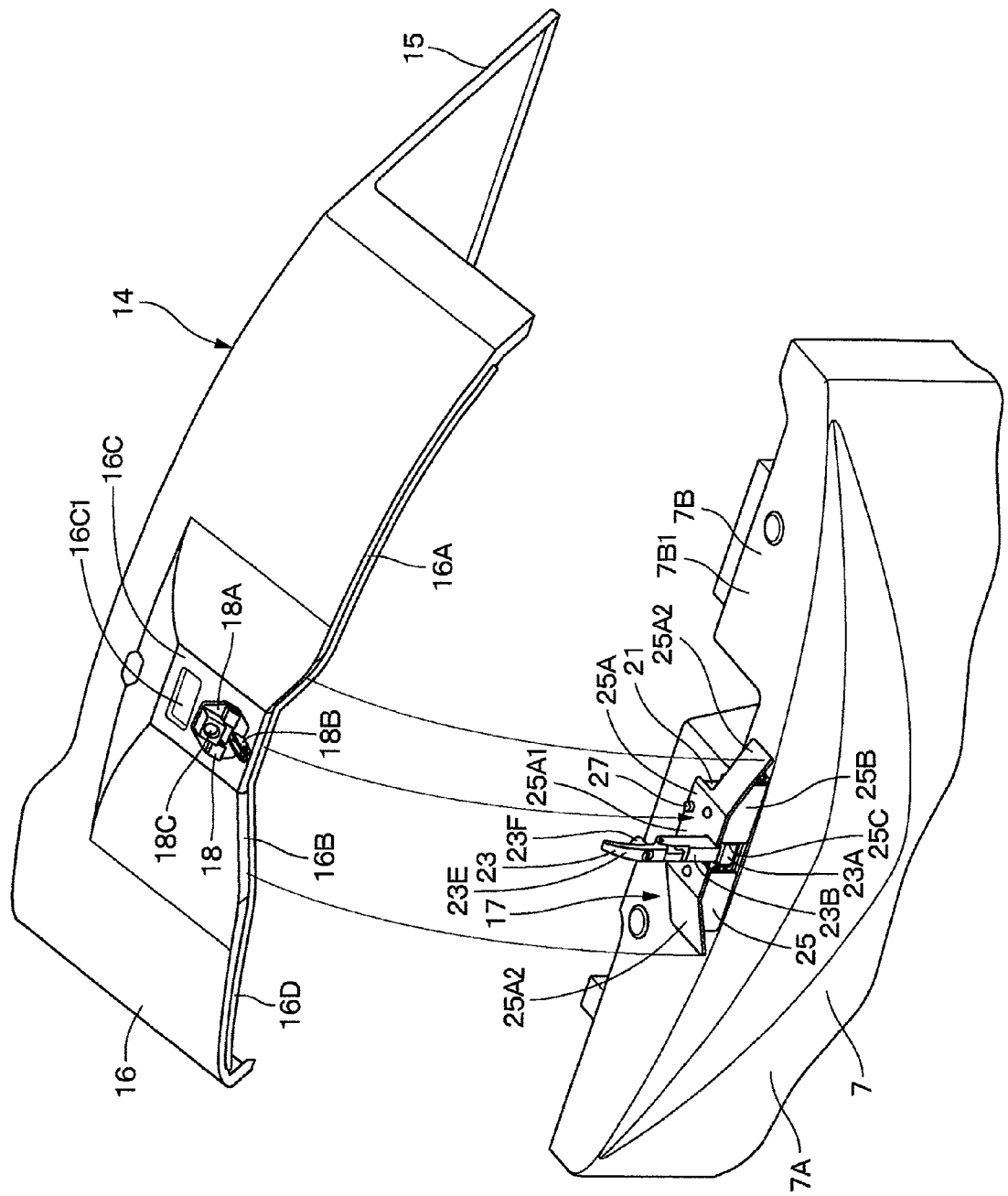
FIG. 6 is an external perspective view showing a part of a counterweight, the lock device and a hiding member in a state where an engine cover is opened, as viewed from an oblique rear side.
Figure 10:
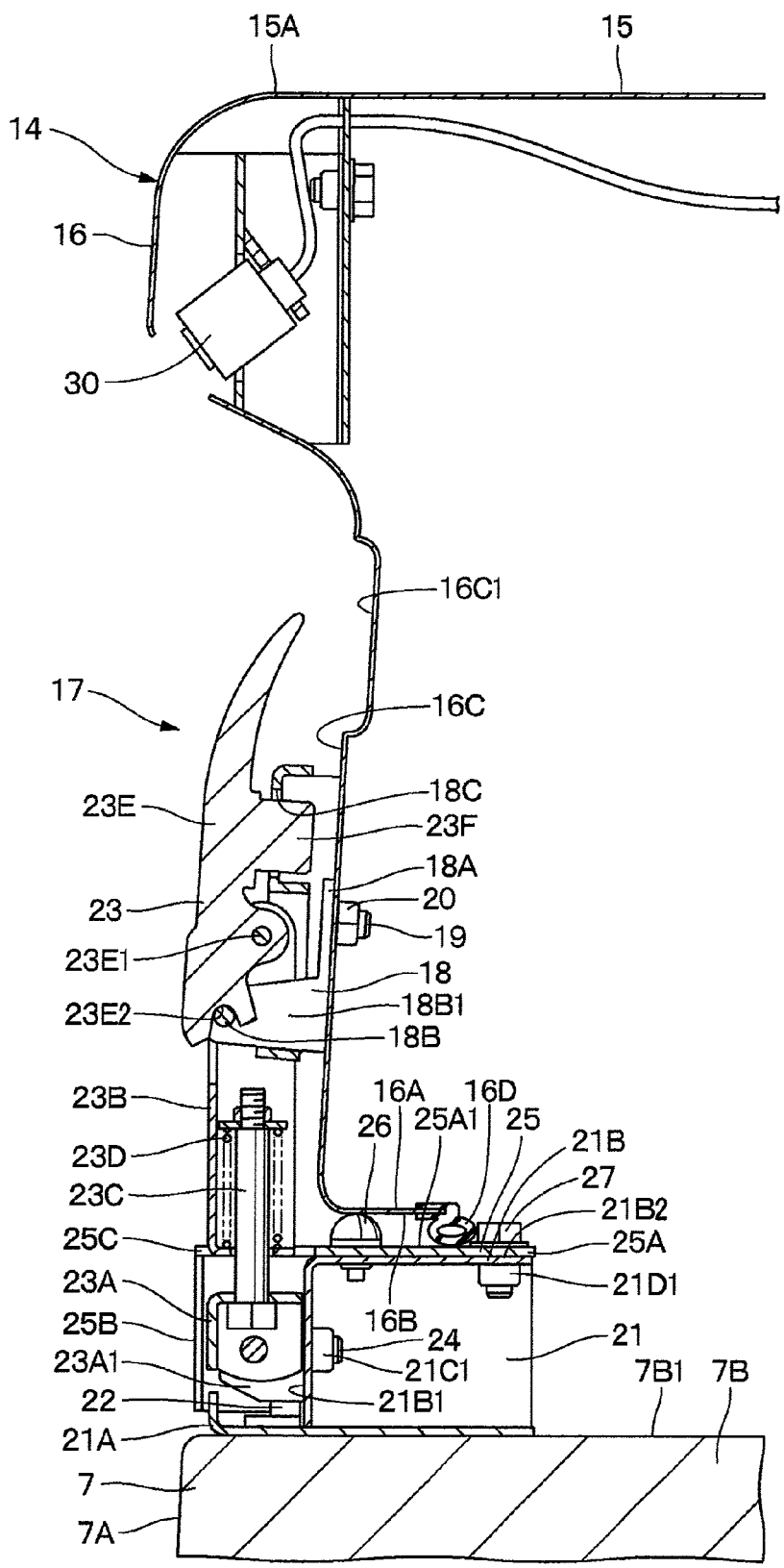
FIG. 10 is an enlarged cross-sectional view shown by enlarging an essential portion in FIG. 4.

On the other hand, as shown in FIG. 6 and FIG. 10, a lower side of the rear surface part 16 in the engine cover 14 is bent toward the engine 8 side (inner direction) to form a lower end portion 16A, and a seal member 16D to be described later is mounted in a distal end of the lower end portion 16A. The lower end portion 16A of the rear surface part 16 has a center portion of the entire length extending in the left-right direction making contact with a top surface of a hiding member 25 to be described later and a large part of the other making contact with the top surface 7B1 of the center weight portion 7B.

Figure 9:
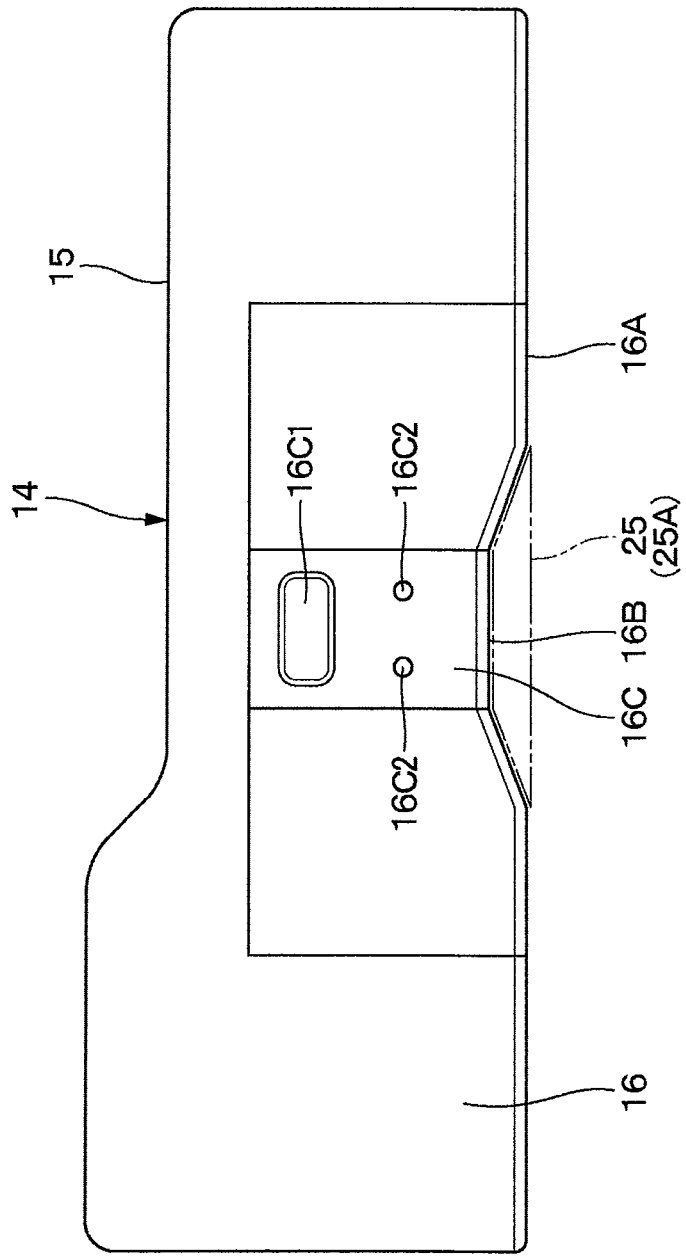
FIG. 9 is a rear view showing the engine cover as a single unit as viewed from a rear side.

Here, as shown in FIG. 9, a trapezoidal notched portion 16B is formed in a lower end side of the rear surface part 16 to be positioned in the center of the left-right direction corresponding to the lock device 17 to be described later. The notched portion 16B is structured for the hiding member 25 to be fitted therein in a state where the engine cover 14 is closed. Therefore the rear surface part 16 can eliminate a clearance between the lower end portion 16A and the hiding member 25, and is located to prevent hiding member bolts 27 to be described later fixing the hiding member 25 from being visible from outside in a state where the engine cover 14 is closed.

Further, a lock device-accommodating recessed portion 16C is provided on the rear surface part 16 in the center position in the left-right direction and in an upper side position of the notched portion 16B. The lock device-accommodating recessed portion 16C is formed to be recessed from the rear surface part 16 toward the engine 8 side (inner direction), and can accommodate the lock device 17 in a lock state where the latch 23 is engaged to the striker 18. As a result, the lock device-accommodating recessed portion 16C prevents the lock device 17, particularly the latch 23 from projecting from the rear surface part 16, and is thus configured such that the lock device 17 does not interfere with obstacles at a revolving operation.

Further, as shown in FIG. 10 and the like, the lock device-accommodating recessed portion 16C is provided with a recessed portion 16C1 formed by recessing a portion thereof closer to the upper side to a further inner side. The recessed portion 16C1 acts to secure a clearance to the lock device-accommodating recessed portion 16C in such a manner that at the time of operating an engaging lever 23E of the latch 23, the engaging lever 23E is easy to grab. As shown in FIG. 9, the lock device-accommodating recessed portion 16C is provided with two bolt through holes 16C2 positioned in the lower side of the recessed portion 16C1, and a striker bolt 19 to be described later is inserted into each of the bolt through holes 16C2 for fixing the striker 18.

Next, the configuration of the lock device 17 forming a characteristic part of the first embodiment will be in detail described.

That is, designated at 17 is the lock device for lockably/unlockably locking the engine cover 14 to the counterweight 7 in a state where the engine cover 14 is closed.

The lock device 17 is configured by the striker 18, which will be described later, provided on the rear surface part 16 of the engine cover 14, the bracket 21 provided on the counterweight 7, the latch 23 mounted to the bracket 21, and the hiding member 25 mounted to the bracket 21.

Figure 13:
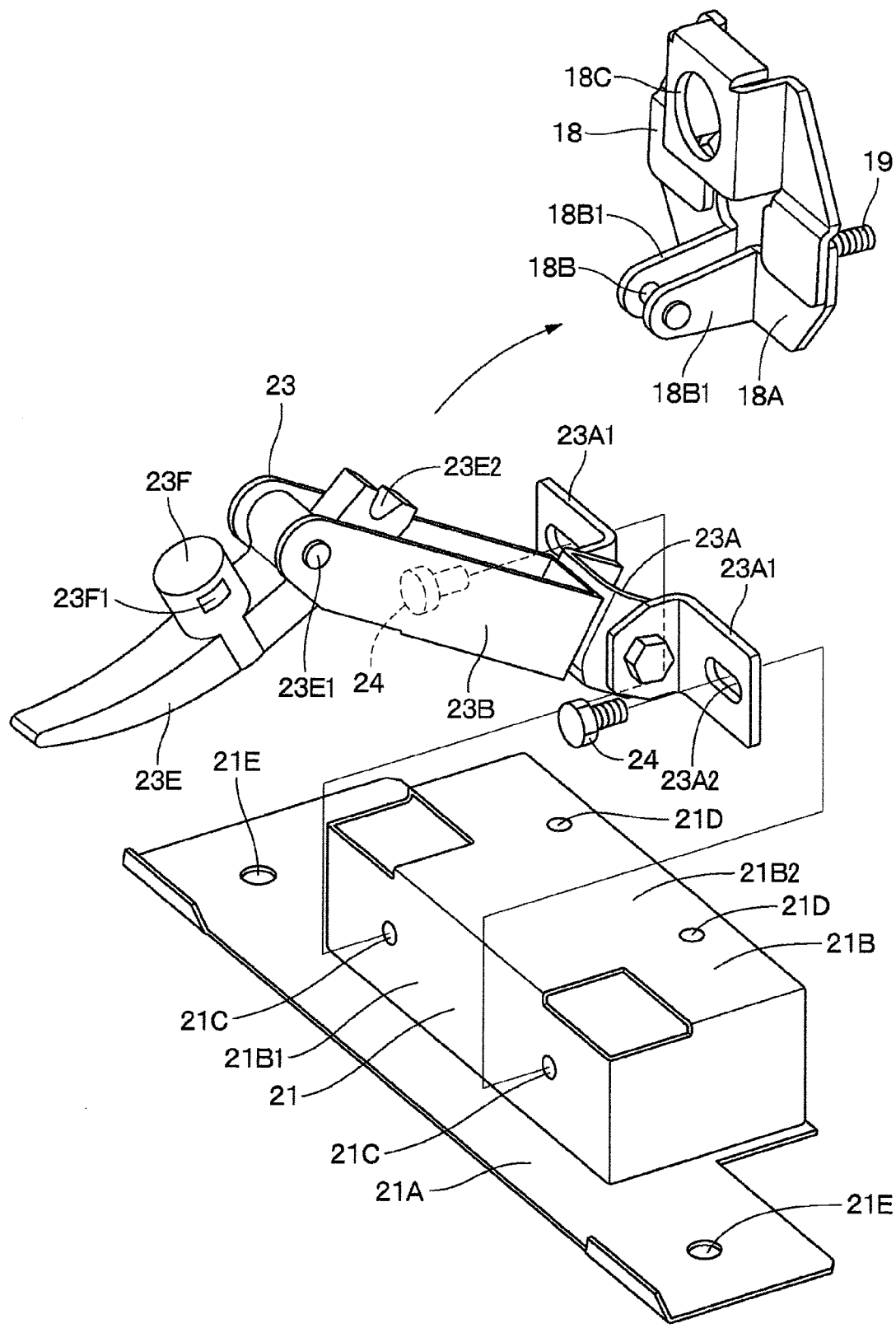
FIG. 13 is an external perspective view showing a state where the bracket, the striker and the latch are disconnected.
Figure 14:
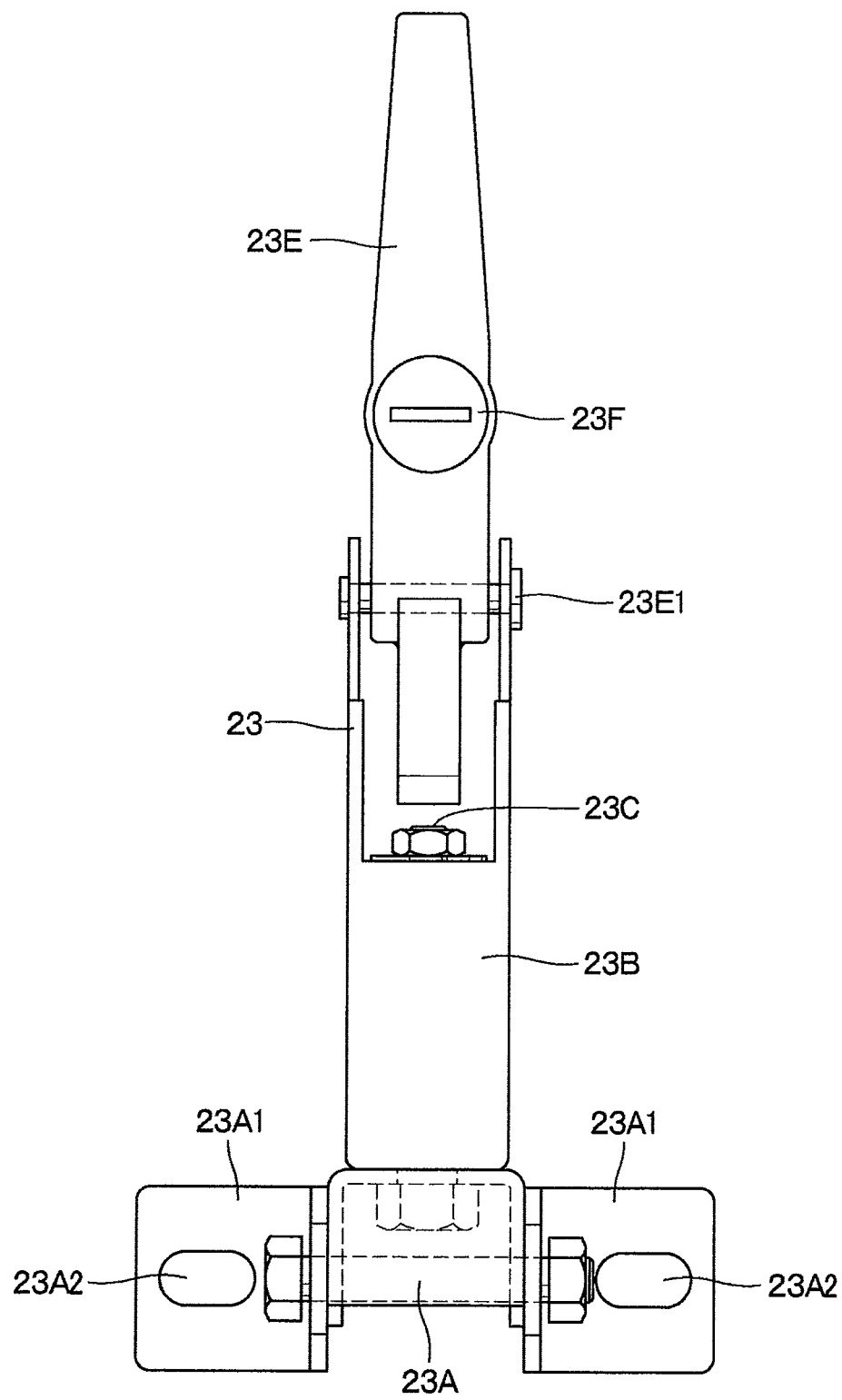
FIG. 14 is a front view shown by enlarging the latch as a single unit.
Figure 15:
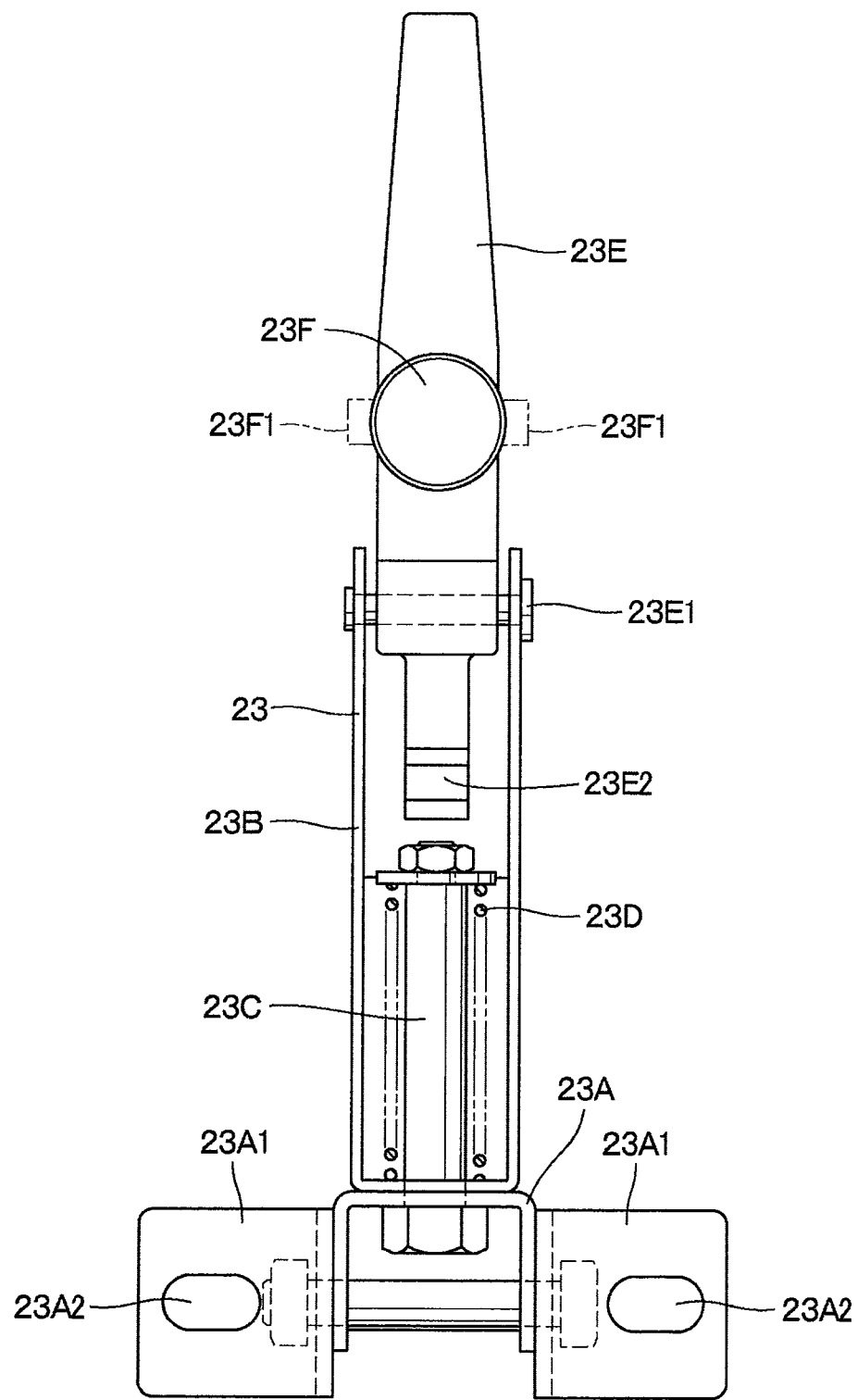
FIG. 15 is a back view shown by enlarging the latch as a single unit.

Indicated at 18 is the striker provided in the center position of the rear surface part 16 in the engine cover 14, and the striker 18 is positioned downward of the recessed portion 16C1 and is mounted to the lock device-accommodating recessed portion 16C. As shown in FIG. 13 and the like, the striker 18 is configured by a flat mounting plate 18A, an engaging pin 18B mounted in distal ends of a pair of projections 18B1 positioned downward of the mounting plate 18A and projecting backward from a rear surface of the mounting plate 18A, and a circular cylinder through hole 18C positioned in an upper side of the mounting plate 18A and provided on the rear surface of the mounting plate 18A.

As shown in FIG. 13, striker bolts 19 as striker fixing tools are provided on a front surface (side of the engine 8) of the mounting plate 18A. The striker bolt 19 has the structure of being incapable of being loosened from an outside of the mounting plate 18A. That is, the striker bolt 19 is formed, for example, by a welding bolt provided to extend forward from the mounting plate 18A.

Here, the striker 18 is fixed to the rear surface part 16 by inserting the striker bolts 19 into the bolt through holes 16C2 provided in the lock device-accommodating recessed portion 16C of the rear surface part 16 and threading nuts 20 into the striker bolts 19 from the inside of the rear surface part 16. In this mounting structure, for the striker bolts 19, the nut 20 can be loosened only from the inside of the rear surface part 16 of the engine cover 14. That is, the striker bolt 19 cannot be removed in a state where the engine cover 14 is closed.

Indicated at 21 is the bracket provided on the top surface 7B1 of the center weight portion 7B forming part of the counterweight 7. As shown in FIG. 7, the bracket 21 is formed of a lower surface plate 21A extending in the left-right direction, and a square-shaped projecting portion 21B in a rectangular shape formed on the lower surface plate 21A. A latch mounting surface 21B1 forming the rear side of the square-shaped projecting portion 21B is provided with two female screw holes 21C using welding nuts 21C1, which are formed having an interval therebetween in the left-right direction. On the other hand, a hiding member mounting surface 21B2 forming the upper side of the square-shaped projecting portion 21B is provided with two female screw holes 21D, using welding nuts 21D1, which are formed having an interval therebetween in the left-right direction. Further, the lower surface plate 21A is provided with left and right bolt through holes 21E formed thereon to sandwich the square-shaped projecting portion 21B therebetween.

The bracket 21 as thus configured is mounted to the counterweight 7 by inserting bracket bolts 22 as bracket fixing tools into the respective bolt through holes 21E and threading the bracket bolts 22 into female screw holes 7B2 provided on the top surface 731 of the center weight portion 7B forming part of the counterweight 7.

Indicated at 23 is the latch provided in the bracket 21. As shown in FIG. 10, the latch 23 is located in the rear side of the counterweight 7 to be accommodated closer to the inside than the outer peripheral surface 7A of the counterweight 7. As shown in FIG. 10 to FIG. 15, the latch 23 is configured by a mounting portion 23A provided with left and right leg bodies 23A1 rotatable in the upper-lower direction and in the front-rear direction, a movable portion 23B telescopically mounted in the mounting portion 23A, a connecting rod 23C accommodated in the movable portion 23B and connecting the movable portion 23B to the mounting portion 23A, a spring member 23D provided between the connecting rod 23C and the movable portion 23B and comprising a compression spring urging the movable portion 23B to be closer to the mounting portion 23A, an engaging lever 23E rotatably mounted through a pin 23E1 to the distal end portion of the movable portion 23B at the intermediate portion thereof in a longitudinal direction, and a key cylinder 23F mounted in the intermediate portion of the engaging lever 23E and closer to the distal end side than the pin 23E1.

The bolt through hole 23A2 is formed in the respective leg bodies 23A1 of the mounting portion 23A. On the other hand, a groove portion 23E2 is formed in the base end portion of the engaging lever 23E for being engaged to the engaging pin 18B of the striker 18. Further, the key cylinder 23F is formed as a columnar body inserted into the cylinder through hole 18C of the striker 18 in a locking state shown in FIG. 10. A key (not shown) inserted into the key cylinder 23F is rotated to project pawl portions 23F1 (shown in a two-dot chain line of FIG. 15), thus making it possible to lock the lock device 17 to a retaining state, and by reversely rotating the key to pull in the pawl portions 23F1, the lock device 17 can be unlocked.

In regard to the latch 23, the latch bolts 24 as the latch fixing tools are inserted into the bolt through holes 23A2 of the mounting portion 23A, and the bolts 24 are threaded into the female screw holes 21C provided in the latch mounting surface 21B1 of the square-shaped projecting portion 21B forming part of the bracket 21. Thereby the latch 23 can be mounted on the bracket 21.

Indicated at 25 is the hiding member provided on the upper side of the bracket 21. The hiding member 25 covers and hides the bracket bolts 22 and the latch bolts 24. That is, as shown in FIG. 7, the hiding member 25 is configured by a rectangular top plate 25A extending in the left-right direction and forming the top surface of the hiding member 25, and blinding plates 25B hanging down from a rear portion of the top plate 25A. The top plate 25A and the blinding plates 25B are provided with a notched groove 25C positioned in the center portion in the left-right direction, and the notched groove 25C forms part of a relief groove for the latch 23 at the time the latch 23 rises up.

Here, the top plate 25A is formed of a center plate portion 25A1, and side plate portions 25A2 extending obliquely downward from both of left and right sides of the center plate portion 25A1. Two bolt through holes 25A3 are formed in a front position of the center plate portion 25A1 to correspond to the respective female screw holes 21D of the bracket 21. The two bolt through holes 25A3 are, at the time of closing the engine cover 14, positioned closer to a side (inside) of the engine 8 than the rear surface part 16 of the engine cover 14, that is, to be hidden in the inside of the engine cover 14.

Further, for example, two cushion members 26 are mounted on the rear position of the top plate 25A. Each cushion member 26, at the time of closing the engine cover 14, makes contact with the lower end portion 16A of the rear surface part 16 to absorb a shock.

The hiding member 25 is mounted to the bracket 21 by inserting the hiding member bolts 27 as the hiding member fixing tools into the blot through holes 25A3 of the top plate 25A and threading the hiding member bolts 27 into the female screw holes 21D provided on the hiding member mounting surface 21B2 of the square-shaped projecting portion 21B. In this way, in a state where the hiding member 25 is mounted to the bracket 21, each bracket bolt 22 can be covered and hidden by each side plate portion 25A2 of the top plate 25A. On the other hand, the latch bolts 24 can be covered and hidden by the blinding plates 25B.

Further, as shown in FIG. 10, the hiding member bolts 27 for mounting the hiding member 25 to the bracket 21 are arranged closer to the inside than the lower end portion 16A of the rear surface part 16 in the closed engine cover 14. In detail, the hiding member bolts 27 is arranged closer to a side of the engine 8 than a position where the seal member 16D provided in the distal end of the lower end portion 16A of the rear surface part 16 makes contact with the top plate 25A of the hiding member 25, that is, inside (in the front side) of the rear surface part 16, so that the hiding member bolts 27 can be hidden from outside.

Figure 11:
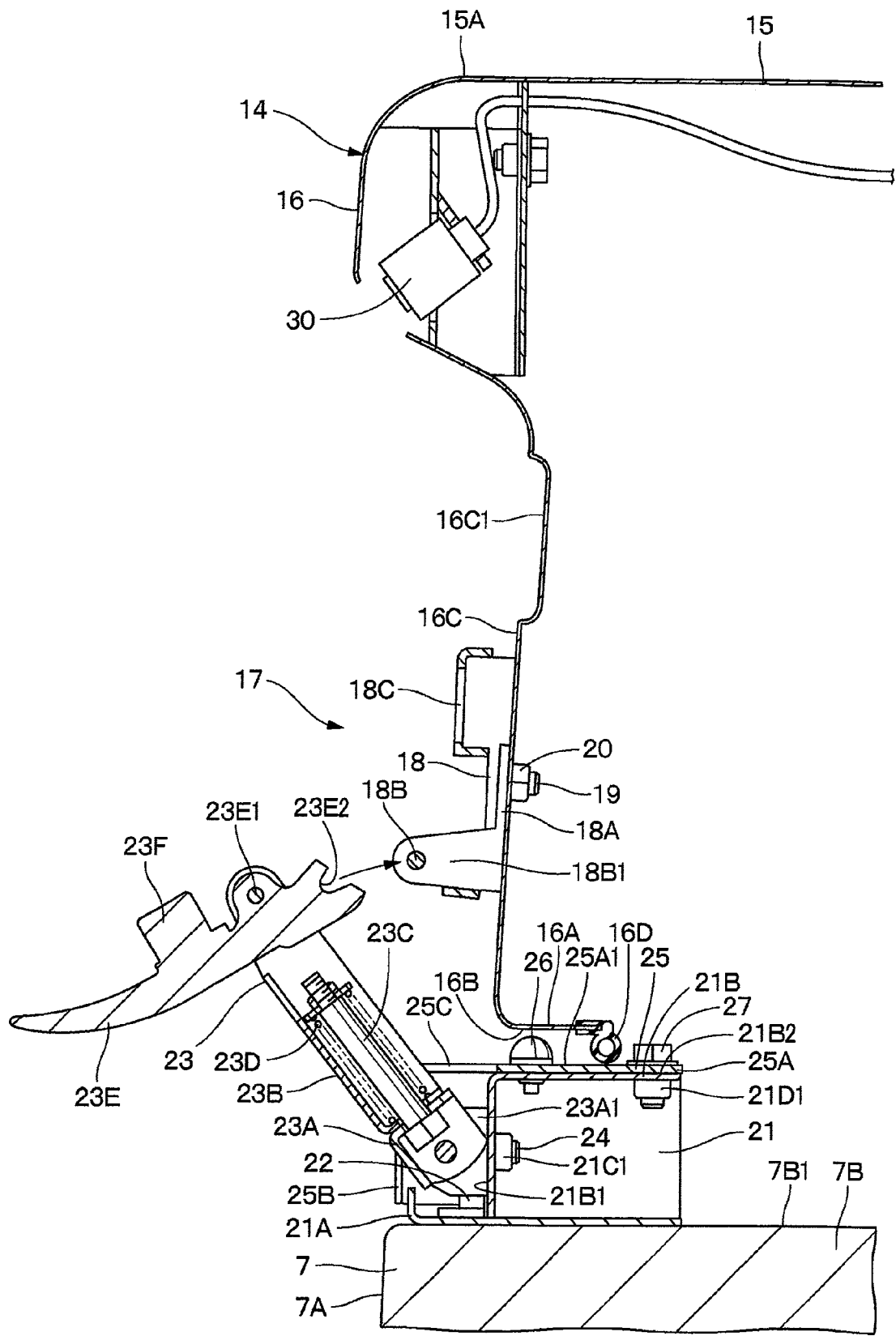
FIG. 11 is an enlarged cross-sectional view showing a state where the latch moves toward the striker as viewed in a position similar to that in FIG. 10.
Figure 12:
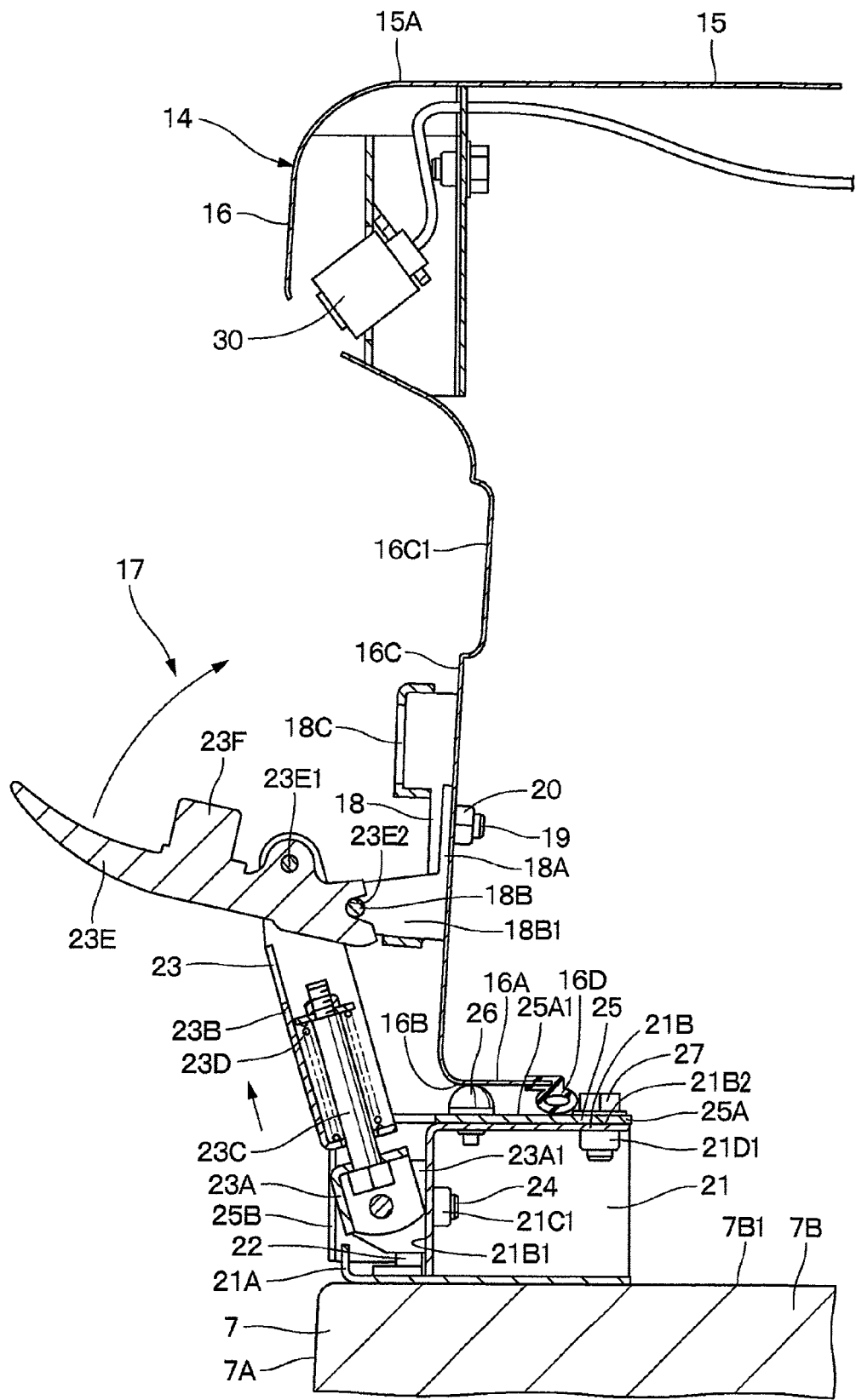
FIG. 12 is an enlarged cross-sectional view showing a state where an engaging lever of the latch engaged to the striker moves in a lock position as viewed in a position similar to that in FIG. 10.

The lock device 17 is configured in this way. As shown in FIG. 11, the groove portion 23E2 of the engaging lever 23E forming part of the latch 23 is engaged to the engaging pin 18B of the striker 18 in a state where the engine cover 14 is closed, and, as shown in FIG. 12, the distal end of the engaging lever 23E is rotated toward the striker 18 in an arrow direction to rise up. Therefore as shown in FIG. 10, the latch 23 can be arranged in the lock position where the key cylinder 23F is inserted into the cylinder through hole 18C of the striker 18. In a state where the latch 23 is arranged in the lock position, the latch 23 can be locked in a retaining state or unlocked by inserting the key into the key cylinder 23F and rotating the key therein.

It should be noted that, as shown in FIG. 2, the operating oil tank 28 is positioned in front of the hydraulic pump 9 and is provided on the revolving frame 5, and reserves therein operating oil to be supplied to the hydraulic pump 9. A fuel tank 29 is provided laterally to the operating oil tank 28. Further, a camera 30 is provided in the upper portion of the engine cover 14, and displays the backward state, which is not visible for an operator in the cab 6, on a monitor (not shown) in the cab 6.

The hydraulic excavator 1 according to the first embodiment is configured as described above, and next, an operation of the hydraulic excavator 1 will be explained.

First, an operator gets onto the cab 6 and sits on an operator's seat. When the operator operates the traveling lever in this state to drive the lower traveling structure 2, the operator can advance or retreat the hydraulic excavator 1. On the other hand, the operator seated on the operator's seat operates a control lever to operate the working mechanism 4 or the like, thus making it possible to perform an excavating work of earth and sand or the like.

Next, an operation at the time of opening/closing the engine cover 14 will described for performing a maintenance work of the engine 8 or the like. An operator inserts the key into key cylinder 23F of the latch 23 and rotates the key therein to unlock the lock device 17, and in this state, the operator grabs the distal end side of the engaging lever 23E and pulls it down toward the operator side. Therefore the engagement between the groove portion 23E2 of the engaging lever 23E and the engaging pin 18B of the striker 18 can be released to lift and open the engine cover 14.

On the other hand, when the maintenance work of the engine 8 is finished and the engine cover 14 is closed, the groove portion 23E2 of the engaging lever 23E is engaged to the engaging pin 18B of the striker 18, and the engaging lever 23E is made to rise up in this state. As a result, the engaging lever 23E is engaged to the engaging pin 18B, thus making it possible to lock the engine cover 14 in such a manner that it cannot open. Further, by inserting the key into the key cylinder 23F of the latch 23 and rotating the key therein, the lock device 17 can be locked.

Incidentally the lock device 17 according to the first embodiment is assembled according to the following procedure. The striker 18 is fixed to the rear surface part 16 by inserting the striker bolts 19 into the bolt through holes 16C2 provided in the lock device-accommodating recessed portion 16C of the rear surface part 16 in the engine cover 14 and threading the nuts 20 into the striker bolts 19 from the inside of the rear surface part 16.

On the other hand, the bracket 21 is mounted to the counterweight 7 by inserting the bracket bolts 22 into the respective bolt through holes 21E and threading the bracket bolts 22 into the female screw holes 7B2 provided on the top surface 7B1 of the center weight portion 7B in the counterweight 7. Next, in regard to the latch 23, the latch bolts 24 are inserted into the bolt through holes 23A2 of the mounting portion 23A, and the latch bolts 24 are threaded into the female screw holes 21C provided in the latch mounting surface 21B1 of the square-shaped projecting portion 21B forming part of the bracket 21. Thereby the latch 23 can be mounted on the bracket 21.

Further, the hiding member 25 is mounted to the bracket 21 by inserting the hiding member bolts 27 into the blot through holes 25A3 of the top plate 25A and threading the hiding member bolts 27 into the female screw holes 21D provided in the hiding member mounting surface 21B2 of the square-shaped projecting portion 21B.

In the lock device 17 assembled in this way, the bracket bolts 22 and the latch bolts 24 can be covered and hidden by the hiding member 25. Further, the hiding member bolts 27 for mounting the hiding member 25 can be hidden in the inside position closer to the side of the engine 8 than the rear surface part 16 in the engine cover 14 at the time of closing the engine cover 14.

Accordingly, since the striker 18 and the latch 23 can be engaged to each other outside of the engine cover 14, the adjustment work of the engagement state of the engaging lever 23E of the latch 23 to the engaging pin 18B of the striker 18 can be easily carried out visually.

In addition, in a state where the engine cover 14 is closed and the lock device 17 is locked, the nuts 20 fixing the striker 18 and the hiding member bolts 27 fixing the hiding member 25 can be covered and hidden by the engine cover 14. In this state, the bracket bolts 22 fixing the bracket 21 and the latch bolts 24 fixing the latch 23 can be covered and hidden by the hiding member 25. As a result, since the lock device 17 cannot be removed from outside in a state where the engine cover 14 is closed, it is possible to prevent the event that the engine cover 14 is made to open inadvertently.

The hiding member bolts 27 are arranged closer to the inside than the contact position between the lower end portion 16A of the rear surface part 16 in the engine cover 14 and the top plate 25A as the top surface of the hiding member 25. Therefore the hiding member bolts 27 can be certainly covered and hidden by the closed engine cover 14, and the contact therewith from outside can be blocked.

Here, the lower portion of the rear surface part 16 in the engine cover 14 is provided with the notched portion 16B in the center position corresponding to the lock device 17. Therefore even if the hiding member 25 projects from the top surface 7B1 of the center weight portion 7B in the counterweight 7, the hiding member 25 can be fitted in the notched portion 16B at the time of closing the engine cover 14. As a result, the counterweight 7 can make contact with the engine cover 14 without a clearance in a state where the engine cover 14 is closed, to prevent hiding member bolts 27 from being visible from outside.

The lock device-accommodating recessed portion 16C recessed toward the side (inner direction) of the engine 8 is provided in the position corresponding to the notched portion 16B on the rear surface part 16 in the engine cover 14, and the striker 18 is mounted to the lock device-accommodating recessed portion 16C. Accordingly, in a state of engaging the latch 23 to the striker 18, the lock device 17 can be accommodated in the lock device-accommodating recessed portion 16C such that the lock device 17 does not project out of the rear surface part 16 of the engine cover 14, which can prevent the lock device 17 from interfering with obstacles in the surroundings.

The counterweight 7 comprises the high center weight portion 7B, the low left weight portion 7C and the low right weight portion 7D to be formed in a reverse T-letter shape. Therefore the rear surface part 16 of the engine cover 14 can make contact with the center weight portion 7B of the counterweight 7, and the bracket 21 can be provided on the top surface 7B1 of the center weight portion 7B.

Further, the striker 18 is mounted to the rear surface part 16 of the engine cover 14 from the inside of the rear surface part 16 by using the striker bolts 19 and the nuts 20. Therefore the striker bolts 19 and the nuts 20 can be protected in such a manner as not to be loosened from outside.

Figure 16:
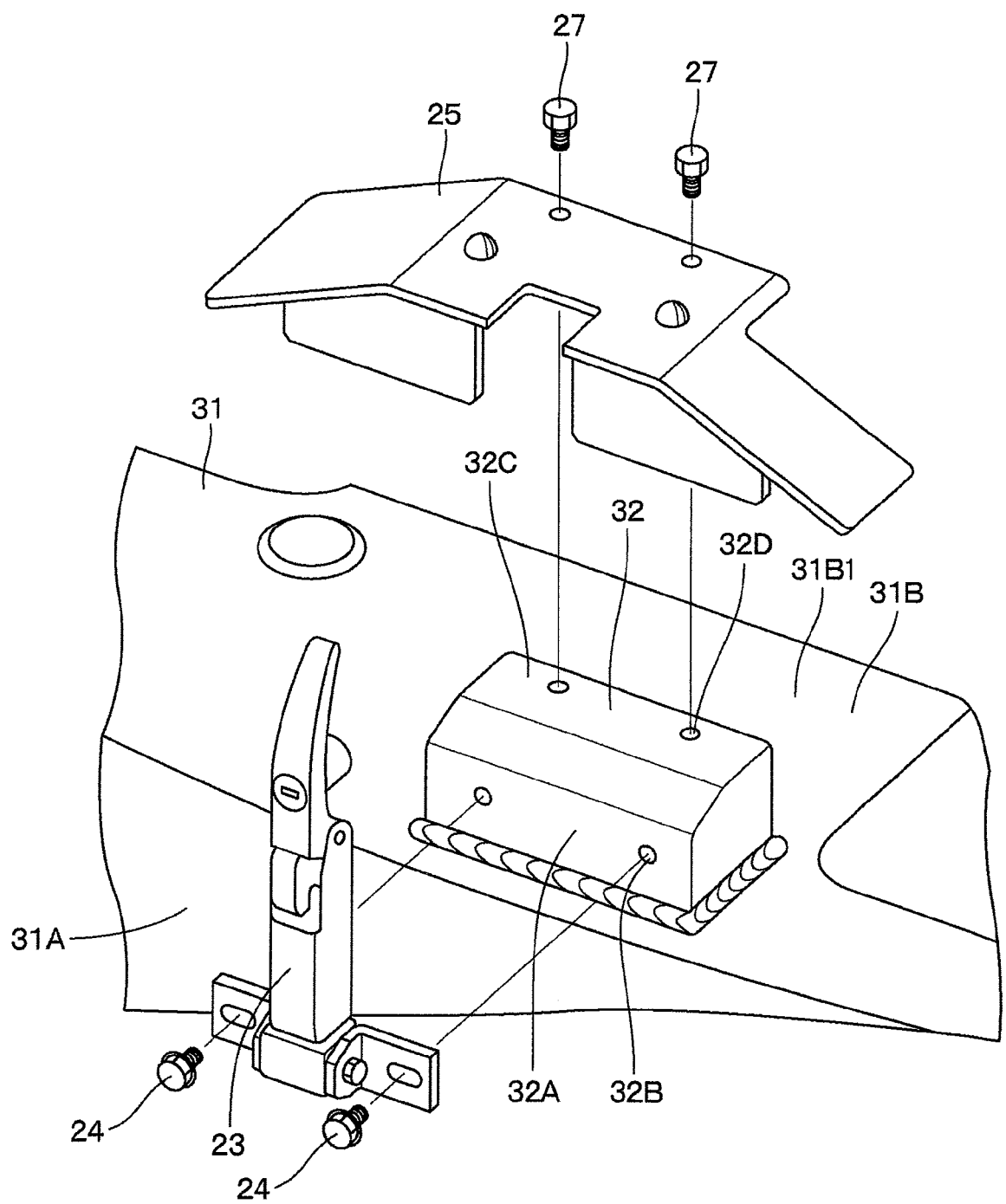
FIG. 16 is an exploded perspective view showing a counterweight and a bracket according to a second embodiment of the present invention together with the latch and the hiding member.

Next, FIG. 16 shows a second embodiment according to the present invention. The second embodiment is characterized in that a bracket is welded integrally on a top surface of a center weight portion in a counterweight, and a latch and a hiding member are mounted to the bracket. It should be noted that in the second embodiment, the component elements that are identical to those of the foregoing first embodiment will be simply denoted by the same reference numerals to avoid repetitions of similar explanations.

In FIG. 16, denoted at 31 is a counterweight in the second embodiment. The counterweight 31 has, as substantially similar to the counterweight 7 in the first embodiment, an arc-shaped outer peripheral surface 31A, and is configured by a center weight portion 31B, a left weight portion, and a right weight portion (none of them are shown). However, the counterweight 31 according to the second embodiment differs from the counterweight 7 in the first embodiment in a point where female screw holes are eliminated on a top surface 31B1 of the center weight portion 31B and a bracket 32 to be described later is welded integrally on the top surface 31B1.

That is, indicated at 32 is the bracket in the second embodiment provided on the top surface 31B1 of the center weight portion 31B forming part of the counterweight 31. The bracket 32 is formed in a rectangular shape, and is welded integrally on the top surface 31B1 of the center weight portion 31B by using welding means. A latch mounting surface 32A formed as the rear side of the bracket 32 is provided with two female screw holes 32B, and a hiding member mounting surface 32C formed as the top side thereof is provided with two female screw holes 32D.

In the bracket 32 as configured thus, the latch 23 can be mounted on the latch mounting surface 32A by threading the latch bolts 24 into the female screw holes 32B. On the other hand, the hiding member 25 can be mounted on the hiding member mounting surface 32C by threading the hiding member bolts 27 into the female screw holes 32D.

Accordingly, also in the second embodiment as thus configured, the operational effect as substantially similar to that of the first embodiment can be obtained. Particularly according to the second embodiment, since the bracket 32 is fixed on the top surface 31B1 of the center weight portion 31B in the counterweight 31 by using the welding means, the female screw hole, the bolt and the like can be eliminated to improve an assembling workability.

It should be noted that the first embodiment is explained by taking a case of using the bolts 19, 22, 24, and 27 as the striker fixing tool, the bracket fixing tool, the latch fixing tool, and the hiding member fixing tool, as an example. However, the present invention is not limited to the same, and configuration may be provided using nuts, pins and the like as the striker fixing tool, the bracket fixing tool, the latch fixing tool, and the hiding member fixing tool. This configuration may be applied to the second embodiment.

The first embodiment is explained by taking a case of using the engine 8 as the prime mover, and driving the hydraulic pump 9 by the engine 8, as an example. However, the present invention is not limited thereto, and configuration may be provided by using an electric motor as the prime mover to drive the hydraulic pump 9 by the electric motor. This configuration may be applied to the second embodiment.

The first embodiment is explained by taking a case of using the bracket bolts 22 to mount the bracket 21 to the counterweight 7 as an example, and the second embodiment is explained by taking a case of using the welding means to mount the bracket 32 to the counterweight 31 as an example. However, the present invention is not limited to the same, but, for example, at the time of molding the counterweight with casting means, the bracket may be molded together therewith.

Each embodiment is explained by taking a case of being applied to the hydraulic excavator 1 of a cab type equipped with the cab 6 provided in the upper revolving structure 3, as an example. However, the present invention is not limited to the same, but, for example, the present invention may be applied to a hydraulic excavator of a canopy type covering at least only an upper side of an operator's seat.

Further, each embodiment is explained by taking a case of using the hydraulic excavator 1 of a crawler type as the construction machine as an example. However, the present invention is not limited to the same, but, for example, the present invention may be applied to a hydraulic excavator equipped with a lower traveling structure of a wheel type. Further, the present invention may be widely applied to the other construction machine equipped with a prime mover such as a hydraulic crane.

DESCRIPTION OF REFERENCE NUMERALS

1: Hydraulic excavator (Construction machine)
2: Lower traveling structure
3: Upper revolving structure
4: Working mechanism
5: Revolving frame
5A: Cover support member
7, 31: Counterweight
7A, 31A: Outer peripheral surface
7B, 31B: Center weight portion
7C: Left weight portion
7D: Right weight portion
8: Engine (Prime mover)
9: Hydraulic pump
11: Exterior cover
12: Left side door
13: Right side door
14: Engine cover (Prime mover cover)
15: Top surface part
16: Rear surface part
16B: Notched portion
16C: Lock device-accommodating recessed portion
17: Lock device
18: Striker
18B: Engaging pin
19: Striker bolt (Striker fixing tool)
20: Nut
21, 32: Bracket
21B: Square-shaped projecting portion
21B1, 32A: Latch mounting surface
21B2, 32C: Hiding member mounting surface
22: Bracket bolt (Bracket fixing tool)
23: Latch
23E: Engaging lever
23E2: Groove portion
24: Latch bolt (Latch fixing tool)
25: Hiding member
25A: Top plate
25B: Blinding plate
27: Hiding member bolt (Hiding member fixing tool)

What is claimed is:

1. A construction machine comprising:
an automotive lower traveling structure;
an upper revolving structure swingably mounted on said lower traveling structure; and
a working mechanism mounted on said upper revolving structure and capable of tilting up and down,
wherein said upper revolving structure comprises:
a revolving frame forming a support structure;
a counterweight located in a rear side of said revolving frame to act as a weight balance to said working mechanism;
a prime mover positioned in a front side of said counterweight and mounted on said revolving frame to drive a hydraulic pump;
a prime mover cover including a top surface part covering said prime mover from above and a rear surface part hanging down from a rear end of said top surface part configured to make contact with a top surface of said counterweight; and
a lock device for locking/unlocking said prime mover cover to said counterweight in a state where said prime mover cover is closed,
wherein said top surface of said counterweight makes contact with said rear surface part of said prime mover cover in the state where the prime mover cover is closed,
wherein said lock device comprises:
a striker disposed in said rear surface part of said prime mover cover;
a bracket disposed on said top surface of said counterweight, said bracket including a rear side having a latch mounting surface and a top side having a hiding member mounting surface;
a latch mounted on said latch mounting surface of said bracket using a latch fixing tool, said latch is configured to engage with said striker; and
a hiding member mounted on said hiding member mounting surface of said bracket from an upper side of said counterweight using a hiding member fixing tool, said hiding member covers said latch fixing tool,
wherein said hiding member fixing tool is hidden from an outside view, inside of said prime mover cover when said prime mover cover is closed, and
wherein said striker and said latch engage each other outside of said prime mover cover when said prime mover cover is closed.

2. The construction machine according to claim 1, wherein said bracket is mounted to said top surface of said counterweight using a bracket fixing tool, and said hiding member covers said bracket fixing tool together with said latch fixing tool.

3. The construction machine according to claim 1, wherein at the time of closing said prime mover cover, a lower end portion of said rear surface part makes contact with a top surface of said hiding member, and
wherein said hiding member fixing tool is arranged closer to the inside of said rear surface part than a contact position between said lower end portion of said rear surface part and said top surface of said hiding member.

4. The construction machine according to claim 1, wherein said rear surface part in said prime mover cover is notched at a lower end side in a position corresponding to said lock device, thereby forming a notched portion in said rear surface part, in which said hiding member is fitted at the time of closing said prime mover cover, and
wherein said rear surface part of said prime mover cover is recessed to a side of said prime mover in a position corresponding to said notched portion, thereby forming a lock device-accommodating recessed portion in said rear surface part for accommodating said lock device.

5. The construction machine according to claim 1, wherein said counterweight comprises:
a center weight portion positioned in the center of said counterweight in said left-right direction;

a left weight portion positioned in the left side of said center weight portion having a height dimension lower than that of said center weight portion; and a right weight portion positioned in the right side of said center weight portion having a height dimension lower than that of said center weight portion, wherein said rear surface part of said prime mover cover is configured to contact said center weight portion, and wherein said bracket is disposed on said top surface of said center weight portion.

6. The construction machine according to claim 1, wherein said striker is mounted to said rear surface part of said prime mover cover from said inside of said rear surface part by using a striker fixing tool.

7. A construction machine according to claim 1, wherein said hiding member fixing tool includes a bolt fixed through said hiding member to said bracket.

* * * * *